United States Patent
Chen et al.

(10) Patent No.: US 11,459,265 B2
(45) Date of Patent: Oct. 4, 2022

(54) LTCC SUBSTRATE AND PREPARATION METHOD THEREOF

(71) Applicant: GUANGDONG FENGHUA ADVANCED TECHNOLOGY HOLDING CO., LTD., Guangdong (CN)

(72) Inventors: Tao Chen, Guangdong (CN); Kun Huang, Guangdong (CN); Shiwo Ta, Guangdong (CN); Zhenxiao Fu, Guangdong (CN); Yun Liu, Act (AU)

(73) Assignee: GUANGDONG FENGHUA ADVANCED TECHNOLOGY HOLDING CO., LTD., Guangdong (CN)

( * ) Notice: Subject to any disclaimer, the term of this patent is extended or adjusted under 35 U.S.C. 154(b) by 0 days.

(21) Appl. No.: 16/971,698

(22) PCT Filed: Nov. 7, 2019

(86) PCT No.: PCT/CN2019/116357
§ 371 (c)(1),
(2) Date: Aug. 21, 2020

(87) PCT Pub. No.: WO2020/177368
PCT Pub. Date: Sep. 10, 2020

(65) Prior Publication Data
US 2021/0387890 A1    Dec. 16, 2021

(30) Foreign Application Priority Data
Mar. 1, 2019  (CN) .......................... 201910155188.X

(51) Int. Cl.
*C03B 19/06*   (2006.01)
*C03C 12/00*   (2006.01)
*C03C 3/093*   (2006.01)

(52) U.S. Cl.
CPC .............. *C03B 19/06* (2013.01); *C03C 3/093* (2013.01); *C03C 12/00* (2013.01)

(58) Field of Classification Search
CPC .......... C03B 19/06; C03C 3/093; C03C 12/00
See application file for complete search history.

(56) References Cited

U.S. PATENT DOCUMENTS

2013/0052433 A1*   2/2013   Nair .................... H01B 3/085
                                                         428/212

FOREIGN PATENT DOCUMENTS

| CN | 102093031 A | 6/2011 |
| CN | 102167578 A | 8/2011 |

(Continued)

OTHER PUBLICATIONS

CN102167578B machine translation (Year: 2013).*
The second office action of family Japanese patent application dated Aug. 6, 2021.

*Primary Examiner* — Karl E Group
*Assistant Examiner* — Cameron K Miller
(74) *Attorney, Agent, or Firm* — Gang Yu

(57) ABSTRACT

The disclosure relates to a Low Temperature Co-fired Ceramic (LTCC) substrate and a preparation method thereof, and in particular to a dielectric-constant-adjustable LTCC substrate and a preparation method thereof. The LTCC substrate of the disclosure includes the following components: glass, $SiO_2$ and $Al_2O_3$, a weight percentage of the $SiO_2$ in the LTCC substrate is 10% to 25%.

10 Claims, 1 Drawing Sheet

(56) References Cited

FOREIGN PATENT DOCUMENTS

| | | | |
|---|---|---|---|
| CN | 102557590 | A | 7/2012 |
| CN | 103011788 | A | 4/2013 |
| CN | 103086703 | A | 5/2013 |
| CN | 102167578 | B * | 10/2013 |
| CN | 103936401 | A | 7/2014 |
| CN | 103979941 | A | 8/2014 |
| CN | 104016664 | A | 9/2014 |
| CN | 108395102 | A | 8/2018 |
| CN | 109775993 | A | 5/2019 |
| JP | 2014529573 | A | 11/2014 |

* cited by examiner

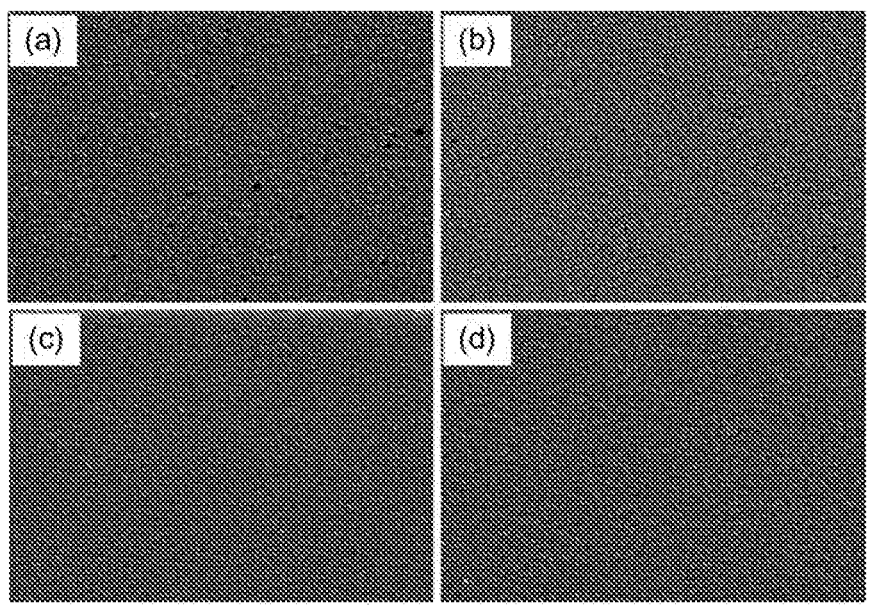

LTCC SUBSTRATE AND PREPARATION METHOD THEREOF

TECHNICAL FIELD

The disclosure relates to a Low Temperature Co-fired Ceramic (LTCC) substrate and a preparation method thereof, and in particular to a dielectric-constant-adjustable LTCC substrate and a preparation method thereof.

BACKGROUND

Along, with the coming of 5G communications and Internet of Everything era, high-frequency applications become a trend. In order to reduce signal transmission loss and accelerate a signal transmission speed, LTCC ceramic powder with a low dielectric constant attracts more and more attention. Because a dielectric constant of $Al_2O_3$ is higher (9-11), it is more difficult to further reduce the dielectric constant of the ceramic powder, although the dielectric constant may be effectively reduced by using a method for increasing a glass proportion in a system, more pores exist in a sintered ceramic body due to excessive addition of, glass, and the reliability and strength of a substrate are greatly reduced.

SUMMARY

A purpose of the disclosure is to provide a dielectric-constant-adjustable LTCC substrate with low porosity and dielectric constant and a preparation method thereof in order to overcome the above deficiencies in a related art.

In order to achieve the above purpose, a technical scheme used by the disclosure is as follows: an LTCC substrate, herein the LTCC substrate includes the following components: glass, $SiO_2$ and $Al_2O_3$, a weight percentage of the $SiO_2$ in the LTCC substrate is 10% to 25%.

The $SiO_2$ is added in the LTCC substrate of the disclosure, the addition of the $SiO_2$ may guarantee the bending strength of the LTCC substrate while a compact substrate with lower porosity is obtained. In addition, through regulating a formula, the dielectric-constant-adjustable LTCC substrate with the low dielectric constant may be obtained.

It is indicated from research that, while the weight percentage of the $SiO_2$ in the LTCC substrate is 10%, the porosity of the LTCC substrate of the disclosure is apparently reduced, dielectric loss thereof is low, and the bending strength is high.

As a preferable implementation mode of the LTCC substrate of the disclosure, the weight percentage of the $SiO_2$ in the LTCC substrate is 20% to 25%. Along with the increase of the $SiO_2$ content in the LTCC substrate, the porosity, the dielectric constant and the dielectric loss of the LTCC substrate are reduced, while the weight percentage of the $SiO_2$ in the LTCC substrate is greater than 20 wt %, the obtained LTCC substrate is compact without apparent pores, specifically, the porosity of the LTCC substrate is reduced to about 0.11%.

As a preferable implementation mode of the LTCC substrate of the disclosure, the weight percentage of the $SiO_2$ in the LTCC substrate is 20%. If the content of the $SiO_2$ in the LTCC substrate is too high, it may also cause that the bending strength of the LTCC substrate is reduced, the bending strength, the porosity, the dielectric constant and the dielectric loss of the LTCC substrate are comprehensively considered, the weight percentage of the $SiO_2$ in the LTCC substrate is chosen to be 20%.

As a preferable implementation mode of the LTCC substrate of the disclosure, in the LTCC substrate, a weight percentage of the glass is 50% to 60%, and a weight percentage of the $Al_2O_3$ is 25% to 40%. In some embodiments, weight percentage of the glass is 50% to 55%, and the weight percentage of the $Al_2O_3$ is 25% to 30%.

As a preferable implementation mode of the LTCC substrate of the disclosure, the glass is formed by the following components in weight percentage: 45.8% of $SiO_2$, 39.6% of $H_3BO_3$, 3.3% of $K_2CO_3$, 3.6% of $Na_2CO_3$, 0.7% of $Li_2CO_3$, 1.5% of $CaCO_3$, 1.1% of $SrCO_3$, 1.9% of $BaCO_3$, 1.2% of $Al_2O_3$, 0.6% of $MgO$, 0.4% of $TiO_2$ and 0.3% of $ZnO$.

As a preferable implementation mode of the LTCC substrate of the disclosure, the glass is glass powder, and a preparation method for the glass powder is as follows:

(a) weighing each component in the glass in proportion, drying after ball-milling, and then heat-preserving in a temperature above 1250° C., enabling molten glass to be homogenized; and (b) taking out the molten glass, quenching in water, and ball-milling, to obtain glass slurry, drying the glass slurry, to obtain the glass powder.

In the above (a), after ball-milling and drying, each component is heat-preserved in the temperature above 1250° C., so that each component is molten to obtain the above molten glass.

The above glass powder melting temperature may be as low as 1250° C. (the melting temperature in the same industry needs about 1500° C. generally), the cost may be saved in a greater degree by the lower glass melting temperature.

Furthermore, the disclosure provides a preparation method for the above LTCC substrate, herein the preparation method includes the following steps:

(1) weighing glass, $SiO_2$ and $Al_2O_3$ in proportion, ball-milling, enabling the glass, the $SiO_2$ and the $Al_2O_3$ to be mixed uniformly, and then drying, to obtain LTCC ceramic powder;

(2) adding a solvent, a dispersant, a plasticizer, a defoamer and a binder to the LTCC ceramic powder obtained in Step (1), and ball-milling, to obtain ceramic slurry;

(3) enabling the ceramic slurry obtained in Step (2) to be casted into a membrane, performing isostatic pressing treatment after laminating, and then cutting into a raw sheet; and (4) sintering the raw sheet obtained in Step (3), and acquiring the LTCC substrate after cooling.

As a preferable implementation mode of the LTCC substrate of the disclosure, in Step (3), a thickness of the membrane is 60 μm, and a pressure of the isostatic pressing treatment is 20 MPa.

As a preferable implementation mode of the LTCC substrate of the disclosure, in Step (4), sintering the raw sheet obtained in Step (3) in 870° C., and heat-preserving for 30 min, to obtain the LTCC substrate after cooling.

Compared with the related art, the beneficial effects of the disclosure are as follows:

(1) The disclosure is capable of, through adding the $SiO_2$ into the LTCC substrate, enabling porosity, dielectric constant and dielectric loss of the LTCC substrate to be effectively reduced, and improving bending strength of the LTCC substrate in a certain degree. At the same time, because the dielectric constant of the $SiO_2$ is less than that of the $Al_2O_3$, through adjusting a proportion of three parties of the glass, the $SiO_2$ and the $Al_2O_3$, the dielectric constant of the obtained LTCC substrate is adjustable continuously within a wider range of 4.3 to 6.0, the dielectric loss is as low as 0.2%, and the flexibility of a device design is improved; and while the characteristics of low dielectric and low loss of the LTCC substrate are satisfied, the compactness and strength of the sintered substrate are guaranteed. The LTCC substrate of the disclosure is suitable for the high frequency communication field and the radio frequency field.

(2) The glass melting temperature of the disclosure may be as low as 1250° C. (the melting temperature in the same industry needs about 1500° C. generally), the cost may be saved in a greater degree by the lower glass melting temperature.

BRIEF DESCRIPTION OF THE DRAWINGS

FIG. 1 is scanning electron microscope (SEM) diagrams of LTCC substrates in Embodiments 3-5 and Contrast Embodiment 1 of the disclosure.

DETAILED DESCRIPTION OF THE EMBODIMENTS

In order to better describe purposes, technical schemes and advantages of the disclosure, the disclosure is further described below in combination with drawings and specific embodiments.

LTCC Substrates in Embodiments 1-5 and Contrast Embodiment 1

Formation components of the LTCC substrates in Embodiments 1-5 and Contrast Embodiment 1 are as shown in Table 1. Herein, the glass is glass powder, and the glass is formed by the following components in weight percentage: 45.8% of $SiO_2$, 39.6% of $H_3BO_3$, 3.3% of $K_2CO_3$, 3.6% of $Na_2CO_3$, 0.7% of $Li_2CO_3$, 1.5% of $CaCO_3$, 1.1% of $SrCO_3$, 1.9% of $BaCO_3$, 1.2% of $Al_2O_3$, 0.6% of MgO, 0.4% of $TiO_2$ and 0.3% of ZnO.

A preparation method for the glass is as follows:

(a) weighing each component in the glass in proportion, using an agate ball-milling jar, and using deionized water as a medium, planetary-milling for 4 h, discharging, and drying for 12 h in 100° C.;

(b) enabling dried raw material powder to be loaded in a platinum crucible, placing in a high temperature furnace, heat-preserving for 2 h in 1250° C., enabling molten glass to be homogenized, taking out the molten glass in a high temperature, and quenching in the deionized water; and (c) enabling the above quenched glass to be placed in the agate ball-milling jar, using zirconia beads as a dielectric, and using the deionized water as the medium, planetary-milling for 12 h, to obtain glass slurry, enabling the glass slurry to be dried for 12 h in 100° C., to obtain the dry glass powder.

A preparation method for the LTCC substrates in Embodiments 1-5 is as follows:

(1) weighing the glass powder, the SiO2 and the Al2O3 in proportion, in the agate ball-milling jar, using the deionized water as the medium, planetary-milling for 2 h, enabling the powder to be mixed uniformly, and drying for 12 h in 100° C., to obtain LTCC ceramic powder;

(2) adding a suitable amount of a solvent, a dispersant, a plasticizer, a defoamer and a binder to the above ceramic powder, placing in a horizontal ball-milling jar, and ball-milling for 28 h, to obtain uniform stable ceramic slurry;

(3) enabling the above ceramic slurry to be casted into a membrane in 60 μm of a thickness, after laminating, in 20 MPa of an isostatic pressing pressure, cutting into a square raw sheet in 15 mm*15 mm; and (4) enabling the above raw sheet to be sintered in 870° C., heat-preserving for 30 min, after that, furnace-cooling, to obtain the LTCC substrate with a flat surface.

A difference between the preparation method for the LTCC substrates in Contrast Embodiment 1 and the preparation methods for the LTCC substrates in Embodiments 1-5 is only as follows: in Step (1), weighing the glass powder and the Al2O3 in proportion and placing in the agate ball-milling jar.

Porosities, bending strengths, dielectric constants and dielectric losses of the LTCC substrates in Embodiments 1-5 and Contrast Embodiment 1 are tested, the porosities are tested and calculated by using a hydrostatic weighing method according to <People's Republic of China Light Industry Standard: QB/T 1642-2012>, the bending strengths are tested by using a three-point bending method, the dielectric constants in 1 MHz are tested by using a precision bridge tester (Agilent E4980A), and calculated according to a parallel-plate capacitor formula. The dielectric constants and losses in 10 GHz are tested by using a network analyzer through a parallel-plate reflection method. An experiment result is as shown in Table 1. At the same time, a scanning electron microscope (SEM) is used to test the substrates in Embodiments 3-5 and Contrast Embodiment 1, a result is as shown in FIG. 1. In FIG. 1, (a) represents the LTCC substrate in Contrast Embodiment 1, (b) represents the LTCC substrate in Embodiment 3, (c) represents the LTCC substrate in Embodiment 4, and (d) represents the LTCC substrate in Embodiment 5.

TABLE 1

|  | Glass content (wt %) | $SiO_2$ content (wt %) | $Al_2O_3$ content (wt %) | Porosity (%) | Bending strength (MPa) | Dielectric constant @1 MHz | Dielectric loss @1 MHz | Dielectric constant @10 GHz | Dielectric loss @10 GHz |
|---|---|---|---|---|---|---|---|---|---|
| Contrast Embodiment 1 | 60 | 0 | 40 | 2.12 | 142 | 6.2 | 0.34% | 6.3 | 0.67% |
| Embodiment 1 | 60 | 15 | 25 | 0.28 | 149 | 5.0 | 0.29% | 5.1 | 0.52% |
| Embodiment 2 | 55 | 10 | 35 | 0.23 | 169 | 5.4 | 0.25% | 5.5 | 0.41% |
| Embodiment 3 | 50 | 10 | 40 | 0.26 | 178 | 6.0 | 0.23% | 5.8 | 0.35% |
| Embodiment 4 | 50 | 20 | 30 | 0.11 | 186 | 4.9 | 0.20% | 4.7 | 0.32% |
| Embodiment 5 | 50 | 25 | 25 | 0.11 | 167 | 4.3 | 0.21% | 4.2 | 0.32% |

It is indicated from an SEM diagram that, the porosity of a ceramic body may be effectively reduced by adding the $SiO_2$, while the $SiO_2$ content is 10 wt %, the porosity of the ceramic body is apparently reduced, and while the $SiO_2$ content is greater than 20 wt %, there are not apparent pores in the ceramic body. It may be observed from data in Table 1 that, while the $SiO_2$ content is 10 wt %, the porosity of the ceramic body is less than 0.26%, and the bending strength is higher than 169 MPa; and while the $SiO_2$ content is 20 wt %, the porosity is reduced to a minimum value 0.11%, and the bending strength reaches a maximum value 186 MPa. In addition, in 10 GHz of a high frequency, the LTCC substrate of the disclosure may maintain the lower dielectric loss, and may be as low as 0.32%, while the performance of the adjustable dielectric constants is obtained, the loss of the substrate in 1 MHz and high frequency is low, and it has both compactness and higher bending strength. The substrate may be applied to the fields of internet of things, internet of vehicles and 5G radio frequency devices with low latency transmission requirements.

Finally, it is to be noted that the above embodiments are only used to describe technical schemes of the disclosure, but not intended to limit a scope of protection of the disclosure, although the disclosure is described in detail with reference to the preferable embodiments, it should be understood by those of ordinary skill in the art that modifications or equivalent replacements may be made to the technical schemes of the disclosure without departing from the spirit and scope of the technical schemes of the disclosure.

What is claimed is:

1. An LTCC substrate, comprising the following components: glass, $SiO_2$ and $Al_2O_3$, a weight percentage of the $SiO_2$ in the LTCC substrate is 10% to 25%,
    a weight percentage of the glass is 50% to 60%, and a weight percentage of the $Al_2O_3$ is 25% to 40%,
    the glass is formed by the following components in weight percentage: 45.8% of $SiO_2$, 39.6% of $H_3BO_3$, 3.3% of $K_2CO_3$, 3.6% of $Na_2CO_3$, 0.7% of $Li_2CO_3$, 1.5% of $CaCO_3$, 1.1% of $SrCO_3$, 1.9% of $BaCO_3$, 1.2% of $Al_2O_3$, 0.6% of MgO, 0.4% of $TiO_2$ and 0.3% of ZnO.

2. The LTCC substrate as claimed in claim 1, wherein the weight percentage of the $SiO_2$ in the LTCC substrate is 20% to 25%.

3. The LTCC substrate as claimed in claim 2, wherein the weight percentage of the $SiO_2$ in the LTCC substrate is 20%.

4. The LTCC substrate as claimed in claim 1, wherein the glass is glass powder, and a preparation method for the glass powder is as follows:
    (a) weighing each component in the glass in proportion, drying after ball-milling, and then heat-preserving in a temperature above 1250° C., enabling molten glass to be homogenized; and
    (b) taking out the molten glass, quenching in water, and ball-milling, to obtain glass slurry, drying the glass slurry, to obtain the glass powder.

5. A preparation method for the LTCC substrate as claimed in claim 1, comprising the following steps:
    (1) weighing glass, $SiO_2$ and $Al_2O_3$ in proportion, ball-milling, enabling the glass, the $SiO_2$ and the $Al_2O_3$ to be mixed uniformly, and then drying, to obtain LTCC ceramic powder;
    (2) adding a solvent, a dispersant, a plasticizer, a defoamer and a binder to the LTCC ceramic powder obtained in Step (1), and ball-milling, to obtain ceramic slurry;
    (3) enabling the ceramic slurry obtained in Step (2) to be casted into a membrane, performing isostatic pressing treatment after laminating, and then cutting into a raw sheet; and
    (4) sintering the raw sheet obtained in Step (3), and acquiring the LTCC substrate after cooling,
    wherein, the glass is formed by the following components in weight percentage: 45.8% of $SiO_2$, 39.6% of $H_3BO_3$, 3.3% of $K_2CO_3$, 3.6% of $Na_2CO_3$, 0.7% of $Li_2CO_3$, 1.5% of $CaCO_3$, 1.1% of $SrCO_3$, 1.9% of $BaCO_3$, 1.2% of $Al_2O_3$, 0.6% of MgO, 0.4% of $TiO_2$ and 0.3% of ZnO.

6. The preparation method for the LTCC substrate as claimed in claim 5, wherein in Step (3), a thickness of the membrane is 60 μm, and a pressure of the isostatic pressing treatment is 20 MPa.

7. The preparation method for the LTCC substrate as claimed in claim 5, wherein in Step (4), sintering the raw sheet obtained in Step (3) in 870° C., and heat-preserving for 30 min, to obtain the LTCC substrate after cooling.

8. The preparation method for the LTCC substrate as claimed in claim 5, wherein the weight percentage of the $SiO_2$ in the LTCC substrate is 20% to 25%.

9. The preparation method for the LTCC substrate as claimed in claim 5, wherein the weight percentage of the $SiO_2$ in the LTCC substrate is 20%.

10. The preparation method for the LTCC substrate as claimed in claim 5, wherein the glass is glass powder, and a preparation method for the glass powder is as follows:
    (a) weighing each component in the glass in proportion, drying after ball-milling, and then heat-preserving in a temperature above 1250° C., enabling molten glass to be homogenized; and
    (b) taking out the molten glass, quenching in water, and ball-milling, to obtain glass slurry, drying the glass slurry, to obtain the glass powder.

* * * * *